United States Patent [19]

Tobias et al.

[11] 4,128,515

[45] Dec. 5, 1978

[54] WATER REDUCIBLE EPOXY ESTERS AND COATING COMPOSITIONS CONTAINING THEM

[75] Inventors: Michael A. Tobias, Bridgewater; Carlos J. Martinez, Edison, both of N.J.

[73] Assignee: Mobil Oil Corporation, New York, N.Y.

[21] Appl. No.: 833,195

[22] Filed: Sep. 14, 1977

[51] Int. Cl.$^2$ ............................................. C08G 59/14
[52] U.S. Cl. ...................... 260/18 EP; 260/29.2 EP; 528/112
[58] Field of Search .................. 260/18 EP, 29.2 EP, 260/47 EP

[56] References Cited

U.S. PATENT DOCUMENTS

| | | | |
|---|---|---|---|
| 3,374,193 | 3/1968 | Tsatsas et al. | 260/29.2 EP |
| 3,438,849 | 4/1969 | Isack | 260/47 EP X |
| 3,634,326 | 1/1972 | Aubry et al. | 260/47 EP |
| 3,655,817 | 4/1972 | Lohse et al. | 260/47 EP X |
| 3,706,684 | 12/1972 | Lopez | 260/18 EP |
| 3,707,516 | 12/1972 | Walus | 260/18 EP |
| 3,985,695 | 10/1976 | Tobias et al. | 260/47 EN |
| 4,072,804 | 2/1978 | Kleeberg et al. | 260/47 EP X |

*Primary Examiner*—Sandra M. Person
*Attorney, Agent, or Firm*—Charles A. Huggett; Hastings S. Trigg

[57] ABSTRACT

There is provided an acidic ester of a polyepoxy resin, preferably diglycidyl ether of a bisphenol, esterified with an aliphatic dicarboxylic acid. The acid ester is dispersed in alcoholic solvents and water, with a volatile base and further blended with a cross-linking agent and non-ionic surfactant to afford an aqueous dispersion useful as a heat curable coating for beverage cans, coil stock, fabricated metal, and the like.

27 Claims, No Drawings

WATER REDUCIBLE EPOXY ESTERS AND COATING COMPOSITIONS CONTAINING THEM

BACKGROUND OF THE INVENTION

1. Field of the Invention

This invention is concerned with acidic esters of polyepoxy resins and water reducible coating compositions containing them.

2. Description of the Prior Art

In U.S. Pat. No. 3,730,926, there is disclosed an electrophoretic coating formulation prepared by adducting maleic anhydride with unsaturated fatty acids, hydrolyzing, reacting with epoxy resin, and solubilizing with ammonia or amine. The proportion of epoxy to carboxyl used is low relative to that of the present invention.

Insofar as is now known, it has not been proposed to react a dicarboxylic acid with a diglycidyl ether of a bisphenol and solubilizing with an amine or ammonia, or to prepare water-reducible coating formulations therefrom with a crosslinking agent and a catalyst.

SUMMARY OF THE INVENTION

This invention provides an epoxy ester comprising an ester adduct of at least one polyfunctional epoxy resin containing more than one 1,2-epoxy group with a dicarboxylic acid, in a ratio of carboxylic acid equivalents to epoxide of from 1.20 to 1.50, wherein said ester adduct has an acid number of between about 20 and about 40.

It also provides a coating composition comprising said ester adduct neutralized with ammonia or an amine, a crosslinking agent, a crosslinking catalyst (optional), and a nonionic surfactant (optional) in an aqueous vehicle.

DESCRIPTION OF SPECIFIC EMBODIMENTS

The epoxy resin can be any polyglycidyl ether of polyhydric organic compounds, especially polyhydric phenols. Particularly preferred are the glycidyl ethers of bisphenols, a class of compounds which are constituted by a pair of phenolic groups interlinked through an intervening aliphatic bridge. While any of the bisphenols may be used, the compound 2,2-bis(p-hydroxyphenyl) propane, commonly known as bisphenol A, is more widely available in commerce and is preferred. While polyglycidyl ethers can be used, diglycidyl ethers are preferred.

The preferred epoxy resins will have an epoxy equivalent (grams of resin containing one gram-equivalent of epoxide) of between about 170 and about 2200 and an epoxy value between about 0.60 and about 0.05 equivalents epoxy/100 grams. The preferred epoxy resins, i.e., those made from bisphenol A, will have two epoxy groups per molecule.

The aliphatic dicarboxylic acid reactant includes those having the structure $HOOC(R)_xCOOH$, wherein x is 1-34. Such compounds would include the following non-limiting examples: malonic acid, succinic acid, aspartic acid (amino succinic), malic acid (hydroxy succinic), tartaric acid (dihydroxy succinic), glutaric acid, glutamic acid (aminoglutaric acid), adipic acid, pimelic acid, suberic acid, azelaic acid, and sebacic acid; dimerized unsaturated fatty acids up to and including 36-carbon dimer acids derived from: linoleic acid, linolenic acid, ricinoleic acid, linseed fatty acids, safflower fatty acids, soya fatty acids, tall oil fatty acids, cottonseed fatty acids, coconut fatty acids, castor oil fatty acids, dehydrated castor oil fatty acids, or tung oil fatty acids. Also contemplated are diacids resulting as the product from the Diels-Alder reaction of acrylic or methacrylic acid with conjugated unsaturated fatty acids containing up to 18-carbon atoms, e.g.

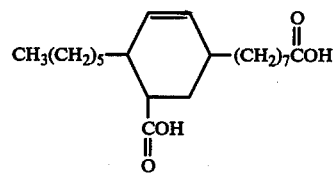

The reaction between polyfunctional epoxy resin and aliphatic dicarboxylic acid is carried out in a suitable solvent, such as methyl ethyl ketone (about 5–10wt. % of reactants). These reactants are dissolved in the methyl ethyl ketone at about 85°–95° C. Then, the reaction mixture containing, preferably, a catalyst is heated to about 150° C. and maintained at that temperature under reflux for about 1.5 hours until the alcoholic acid number is 20–40 and the epoxy content is 0.025–0.035 meq./g. It is generally feasible to remove some of the methyl ethyl ketone through a suitable reflux trap, such as a Dean-Stark trap, in order to maintain reflux temperature.

The esterification reaction can occur without the aid of a catalyst. Catalysts are preferred, however, such as quaternary ammonium hydroxides, such as benzyltrimethylammonium hydroxide; tertiary amines, such as triethylamine, tri-n-butylamine; N,N-dimethylaniline; N,N-benzylmethylamine; and KOH.

The ratio of carboxylic acid equivalents to epoxide equivalents will be from 1.20 to 1.50.

In preparing the final coating composition, the epoxy ester is diluted with a mixture of water dilutable solvents including alkoxyethanols, such as butoxyethanol, methoxyethanol, ethoxyethanol, and hexoxyethanol; alkoxy propanols, such as 1-methoxy-2-propanol and 1-butoxy-2-propanol; alcohols, such as butanol, propanol, and t-butanol; and glycols, such as ethylene glycol and propylene glycol. The epoxy ester is solubilized by neutralization with ammonia, ammonium hydroxide, or an amine such as dimethylethanolamine or triethylamine to a pH of 7–9. Also included in the composition are a crosslinking agent, a catalyst (optional), a surfactant, and water to a final solids content of 1 to 50%.

The surfactants used in the dispersions of this invention are non-ionic surface active agents. These surfactants are well known in the art and are readily available commercially. Typical non-ionic surfactants include polyoxyethylene or polyoxypropylene ethers of higher fatty alcohols and alkyl phenols; fatty acid esters of polyglycols and of anhydrosorbitols; and etherified fatty acid esters of anhydrosorbitols. A preferred class of non-ionic surfactants are the polyoxyethylene ethers of polypropylene glycols having the structure

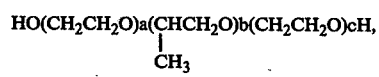

having an average molecular weight between about 10,000 and about 14,000.

The curing agent or crosslinker can be any conventional curing agent that will not adversely affect the dispersion stability. The various curing agents used with epoxy resins are discussed in Lee and Nevill's "Handbook of Epoxy Resins" McGraw-Hill (1967).

The preferred material used to thermoset the coating is conventional aminoplast cross-linking agent. Such agents are well known in the art. There can be used any of the thermosetting alkylated aminoplast resins, such as the urea-aldehyde resins, the melamine-aldehyde resins, the dicyandiamide-aldehyde resins and other aminoplast-aldehyde resins such as those triazine resins produced by the reaction of an aldehyde with formoguanamine, ammeline, 2-chloro-4,6-diamino-1,3,5-triazine, 6-diamino-1,3,5-triazine, 6-methyl-2,4-diamino-1,3,5-triazine; 2,4,6-trihydrazine-1,3,5-triazine; and 2,4,6-triethyl-triamino-1,3,5-triazine. The mono-, di-, or triaralkyl or mono-, di-, or triaryl melamines, for instance 2,4,6-triphenyltriamino-1,3,5-triazine can be used. Also utilizable are benzoguanamine and hexamethoxymethyl melamine. As aldehydes used to react with the amino compound to form the resinous material, one may use such aldehydes as formaldehyde, acetaldehydes, crotonic aldehyde, acrolein, or compounds which engender aldehydes, such as hexamethylenetetramine, paraldehyde, paraformaldehyde, and the like. It is preferred to use an aminoplast that is water soluble.

Although not essential, it is preferable to use an acid cross-linking catalyst. Suitable catalysts include acid phosphates, such as methyl acid phosphate and butyl acid phosphate; acid pyrophosphates, such as dimethyl acid pyrophosphate; organic acid sulfate esters; and organic sulfonic acids, such as p-toluenesulphonic acid. Preferred catalysts are the acid phosphate and the acid sulfate esters of alkylphenoxypoly(ethyleneoxy)ethanol that are known as anionic surfactants. The acid catalysts can be used, for instance, in the form of amine or ammonium salts.

A typical epoxy resin coating formulation of this invention would have the following composition, all parts being expressed as parts by weight:

| Component | Parts |
|---|---|
| Epoxy Ester Resin | 100 |
| Solvent (alkpoxyalkanol-containing) | 30-60 |
| Basic neutralizer | 1.5-15 |
| Non-ionic surfactant | 0 15 |
| Acid catalyst | 0-2 |
| Curing agent | 1-30 |
| Water | 150-350 |

The epoxy coating formulations of this invention are particularly adapted for coating metal substrates having low energy metal surfaces and lubricated metal surfaces such as aluminum, steel, and tin-plated steel. The rate of application will be sufficient to apply the coating at about 1-20 mg./sq. in. Any of the usual methods can be used, including wiping, spraying, and roll coat application. After application the coating is set by baking at about 300° F. to about 500° F. for between about 15 minutes and about 15 seconds.

EXAMPLE 1

A four liter resin kettle was charged with 200.0 g. of methyl ethyl ketone and 2000.0 g. of epoxy resin having an epoxide content of 2.03 meq. epoxy/g. The mixture was heated to dissolve the epoxy resin and then further heated to 105° C. at which point 415.0 g. of adipic acid and 6.4 g. of tri-n-butylamine were added. The temperature was raised gradually to 150° C. while removing sufficient MEK ($\sim$128 g.) to maintain a controlled reflux at this temperature. The reaction was maintained at 150° C. for 1.5 hours at which point it was poured onto a poly(tetrafluoroethylene) lined tray and allowed to cool to ambient temperature. The resulting solid epoxy ester had an alcoholic acid number of 36.3 and an epoxy content of 0.02 meq/g.

One hundred grams of the above epoxy ester was reduced, in sequence, with 30 g. of a 71/29 blend of hexoxyethanol/methoxyethanol, 4.1 g. of 28% aqueous ammonia in 25 g. of deionized water, 225 g. of deionized water, 10 g. of hexamethoxymethylmelamine and 1.7 g of α(p-nonylphenol)-omegahydroxy-poly(oxyethylene) sulfate ammonium salt (58%) to afford an aqueous dispersion with a pH of 7.4 and a Brookfield viscosity of 80 cps.

A tinplate test panel was coated with the above dispersion and baked 4 minutes at 350° F. The coated panel displayed the following properties:

| | |
|---|---|
| Dry film thickness (mils) | 0.1-0.2 |
| Adhesion | 10 |
| Appearance | Excellent |
| MEK Resistance (Double rubs) | 180-200 |
| Pasteurization (45 min. at 170° F.) | |
| Blush | 10 |
| Adhesion | 10 |

EXAMPLES 2-8

The following table contains examples of water dispersible epoxy esters which were prepared in the same manner as that of Example 1.

TABLE

| | Polyepoxide, grams | | | Epoxy-Ester Properties | |
|---|---|---|---|---|---|
| Example | Epon 1001[1] | Epon 1004[2] | Carboxylic Acid (grams) | A.N.[4] | Epoxy Cont.[5] |
| 2 | 230.0 | 230.0 | Dimethylmalonic (75.0) | 35.9 | 0.03 |
| 3 | 1000.0 | 1000.0 | Succinic (262.0) | 30.1 | 0.03 |
| 4 | 250.0 | 1750.0 | Succinic (207.0) | 25.1 | 0.02 |
| 5 | 1000.0 | 1000.0 | Malic (297.0) | 31.0 | 0.02 |
| 6 | 1000.0 | 1000.0 | Adipic (324.0) | 32.7 | 0.02 |
| 7 | 1000.0 | 1000.0 | Adipic (258.0) + Dimer[3] (259.0) | 28.2 | 0.02 |
| 8 | 500.0 | — | Azelaic (135.0) | 37.2 | 0.02 |

[1] Shell Chemical Company, Epoxy Content equals 2.03 meq./gm.-diglycidyl ether of bisphenol A
[2] Shell Chemical Company, Epoxy Content equals 1.14 meq./gm.-diglycidyl ether of bisphenol A
[3] Emery Industries, Inc., Empol 1022 Dimer Acid. (75 wt. % dimer-$C_{36}$-M.W. 565; 22% trimer-M.W. 845; 3% monomer $C_{18}$-M.W. 282)
[4] Acid Number equals mg. KOH per gram epoxy-ester.
[5] Epoxy Content equals meq. epoxy per gram epoxy-ester.

EXAMPLE 9

One hundred grams of the epoxy ester of Example 3 was dissolved in 17.2 g. of n-butanol and 28.8 g. of methoxyethanol at approximately 85°–90° C. and then cooled to 50°–60° C. At this point 2.0 g. of α-hydro-ω-hydroxy-poly(oxyethylene) poly(oxypropylene) ave. M.W. 12,500 and 9.7 g. of hexamethoxymethylmelamine were added and mixed till completely dissolved, followed by gradual addition of 165.0 g. of water with vigorous agitation till all the resin solution was in suspension and the temperature had dropped to approximately 40° C. Subsequently, 1.7 g. of α-(p-nonylphenol)-ω-hydroxy-poly(oxyethylene) sulfate ammonium salt (58%) dissolved in 27.0 g. of water and 3.5 g. of 28% aqueous ammonia in 25.0 g. of water were added under continuous agitation to afford an aqueous dispersion that upon overnight aging at 120° F. presented a pH of 7.3 and a Brookfield viscosity of 22 cps.

Aluminum and tin plate panels were prepared by drawing down with a #10 wire wound bar and baked 75 sec. at 400° F. and 4 min. at 350° F., respectively. The coated panels displayed the following properties:

|  | Tin Plate | Aluminum |
| --- | --- | --- |
| Dry film thickness (mils) | 0.1–0.2 | 0.1–0.2 |
| Appearance | Excellent | Excellent |
| MEK resistance (double rubs) | 200 | 200 |
| Cross hatch adhesion | 10 | 10 |
| Pasteurization (45′–170° F.) |  |  |
| Blush | 10 | 10 |
| Adhesion | 10 | 10 |

EXAMPLE 10

One hundred grams of the epoxy ester of Example 3 was dissolved in 28.8 g. of methoxyethanol and 6.3 g. of n-butanol as previously described in Example 9 followed by the addition of 30.3 g. of urea crosslinking resin butylated urea-formaldehyde and 2.0 g. of α-hydro-ω-hydroxy-poly(oxyethylene)poly(oxypropylene) ave. M.W. 12,500. This resin solution was then dispersed in 165.0 g. of water and neutralized with 3.5 g. of 28% ammonia dissolved in 52.0 g. of water to afford an aqueous dispersion with a pH of 8.7 and a Brookfield viscosity of 100 cps. No acid catalyst was used.

Aluminum and tin plate panels were coated as previously described in Example 9 and displayed the following film properties:

|  | Tin Plate | Aluminum |
| --- | --- | --- |
| Dry Film Thickness (mils) | 0.1–0.2 | 0.1–0.2 |
| Appearance | Excellent | Excellent |
| MEK resistance (double rubs) | 90 | 60 |
| Cross hatch adhesion | 10 | 10 |
| Pasteurization (45′–170° F.) |  |  |
| Adhesion | 10 | 10 |
| Blush | 10 | 10 |

EXAMPLE 11

One hundred grams of the epoxy ester of Example 4 was dissolved in 17.2 g. of n-butanol, 14.4 g. of 1-methoxy-2-propanol and 14.4 g. of 1-butoxy-2-propanol and dispersed in water using the identical procedure and composition to that described in Example 9 to afford an aqueous dispersion with a pH of 7.8 and a Brookfield viscosity of 182.5 cps.

Aluminum and tin plate panels were coated as described in Example 9 and exhibited the following properties:

|  | Tin Plate | Aluminum |
| --- | --- | --- |
| Dry film thickness (mils) | 0.1–0.2 | 0.1–0.2 |
| Appearance | Excellent | Excellent |
| MEK resistance (double rubs) | 100 | 200 |
| Cross hatch adhesion | 10 | 10 |
| Pasteurization (45′–170° F.) |  |  |
| Adhesion | 10 | 10 |
| Blush | 10 | 10 |

EXAMPLE 12

One hundred grams of the epoxy ester from Example 6 was dissolved in 10.0 g. of n-butanol, 10.0 g. hexoxyethanol and 20.0 g. propylene glycol and dispersed in water according to procedure in Example 9 but using 9.6 g. of hexamethoxymethylmelamine, 1.9 g. of α-(p-nonylphenol)-ω-hydroxy-poly(oxyethylene) sulfate ammonium salt (58%), 2.0 g. of α-hydro-ω-hydroxy-poly(oxyethylene)-poly(oxypropylene) ave. M.W. 12,500, 350.0 g. of water and 3.1 g. of 28% ammonia to afford an aqueous dispersion with a pH of 7.6 and a Brookfield viscosity of 10.6 cps.

Aluminum and tin plate panels were prepared as described in Example 9, displaying the following film properties:

|  | Tin Plate | Aluminum |
| --- | --- | --- |
| Dry film thickness (mils) | 0.1–0.2 | 0.1–0.2 |
| Appearance | Excellent | Excellent |
| MEK resistance (double rubs) | 100 | 130 |
| Cross hatch adhesion | 10 | 10 |
| Pasteurization (45′–170° F.) |  |  |
| Adhesion | 10 | 10 |
| Blush | 10 | 10 |

EXAMPLE 13

One hundred grams of the epoxy ester of Example 7 was dissolved in 20.0 g. of propylene glycol, 10.0 g. hexoxyethanol, 10.0 g. n-butanol and dispersed in water as described in Example 9 but using 10.0 g. of hexamethoxymethylmelamine, 2.0 g. of α-hydro-ω-hydroxy-poly(oxethylene)-poly(oxypropylene) ave. M.W. 12,500, 0.96 g. of α-(p-nonylphenol)-ω-hydroxy-poly(oxyethylene) sulfate ammonium salt (58%), 260 g. of water and neutralized with 3.0 g. of 28% ammonia to afford a dispersion with a pH of 7.8 and a Brookfield viscosity of 17 cps.

Aluminum and tin plate panels were coated as described in Example 9 displaying the following film properties:

|  | Tin Plate | Aluminum |
| --- | --- | --- |
| Dry film thickness (mils) | 0.1–0.2 | 0.1–0.2 |
| Appearance | Excellent | Excellent |
| MEK resistance (double rubs) | 35 | 120 |
| Cross hatch adhesion | 10 | 10 |
| Pasteurization (45′–170° F.) |  |  |
| Adhesion | 10 | 10 |
| Blush | 10 | 10 |

The following test procedures were used to rate the coatings in the foregoing examples:

MEK Double Rubs — A pad of felt (2 inch square) soaked in MEK (methylethyl ketone) is rubbed back and forth across the coated surface, while the panel is resting on a firm surface. Each stroke is 2½–3 inches in length at a uniform pressure of about 900 grams and at a rate of about 100 rubs per minute. The pad is resoaked with MEK after 50 double rubs. One double rub is considered as one back and forth stroke.

Pasteurized Adhesion (Past. Adh.) — Pasteurization is carried out by immersing the coated panel in water at 170° F. for 45 minutes. Then, the panel is wiped dry with an absorbent towel and a coated area of the panel is cross-hatched with individual score lines approximately 1/16 inch apart. Scotch tape is firmly applied to the cross-hatched area and removed with a quick snap. Adhesion is rated on a scale of 0 to 10 with 10 representing perfect, i.e., no coating was pulled off with the tape. Blush, i.e., clouding of the film is rated on a 0 to 10 scale with 10 representing no blush.

Spray application on drawn and ironed aluminum cans at 120–180 mg. of coating per can yields film properties acceptable for use as beverage containers after a bake of 3–4 minutes at 350° F.

The coating composition of this invention are particularly adaptable for interior coating of metal containers for beverages, such as beer, unpasteurized beer containing the preservative n-heptyl p-hydroxybenzoate, carbonated soft drinks, non-carbonated soft drink, and fruit juices. Thus, this invention also provides a metal container having its interior surface coated with the coating composition of this invention.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An epoxy ester comprising an ester adduct of at least one polyfunctional epoxy resin containing more than one 1,2-epoxy group with a dicarboxylic acid, in a ratio of dicarboxylic acid equivalents to epoxide equivalents of from 1.20 to 1.50, wherein said ester adduct has an acid number of between about 20 and about 40.

2. The epoxy ester of claim 1, wherein said epoxy resin is a diglycidyl ether of a bisphenol.

3. The epoxy ester of claim 2, wherein said bisphenol is bisphenol A and said epoxy resin has an epoxy equivalent of between about 170 and about 2200.

4. The epoxy ester of claim 3, wherein said epoxy resin is an epoxy resin having an epoxy equivalent of about 493, said dicarboxylic acid is adipic acid, and said acid number is 36.3.

5. The epoxy ester of claim 3, wherein said epoxy resin is a mixture of one part epoxy resin having an epoxy equivalent of about 493 and one part epoxy resin having an epoxy equivalent of about 877, said dicarboxylic acid is succinic acid, and said acid number is 30.1.

6. The epoxy ester of claim 3, wherein said epoxy resin is a mixture of one part epoxy resin having an epoxy equivalent of about 493 and 7 parts epoxy resin having an epoxy equivalent of about 877, said dicarboxylic acid is succinic acid, and said acid number is 25.1.

7. The epoxy ester of claim 3, wherein said epoxy resin is a mixture of one part epoxy resin having an epoxy equivalent of about 493 and one part epoxy resin having an epoxy equivalent of about 877, said dicarboxylic acid is adipic acid, and said acid number is 32.7.

8. The epoxy ester of claim 3, wherein said epoxy resin is a mixture of one part epoxy resin having an epoxy equivalent of about 493 and one part epoxy resin having an epoxy equivalent of about 877, said dicarboxylic acid is a mixture of adipic acid and dimerized unsaturated fatty acids, and said acid number is 28.2.

9. A coating composition comprising in parts by weight per 100 parts by weight of the ester of claim 1 solubilized with, as the solubilizer, 1.5 to 15 parts ammonia, ammonium hydroxide, or a volatile tertiary amine to a pH of 7–9, in 30 to 60 parts of a solvent or mixture of solvents selected from the group consisting of alcohols, alkoxyalkanols, and glycols, 0 to 15 parts nonionic surfactant, 0 to 2 parts acid crosslinking catalyst, 1 to 30 parts curing agent, and 150 to 350 parts water.

10. The coating composition of claim 9, wherein said solubilizer is ammonium hydroxide and said nonionic surfactant is $\alpha$-hydro-$\omega$-hydroxy poly(oxyethylene) poly(oxypropylene) having an average molecular weight of 12,500.

11. The coating composition of claim 10, wherein said epoxy ester is the epoxy ester of claim 5, said solvent is a mixture of butanol and methoxyethanol, said curing agent is hexamethoxymethylmelamine, and said acidic crosslinking catalyst is $\alpha$-(p-nonylphenol)-$\omega$-hydroxy-poly(oxyethylene) sulfate ammonium salt.

12. The coating composition of claim 10, wherein said epoxy ester is the epoxy ester of claim 5, said solvent is a mixture of butanol and methoxyethanol, said curing agent is butylated urea-formaldehyde resin, and an acidic crosslinking catalyst is not used.

13. The coating composition of claim 10, wherein said epoxy ester is the epoxy ester of claim 6, said solvent is a mixture of butanol, 1-methoxy-2-propanol, and 1-butoxy-2-propanol, said curing agent is butylated urea-formaldehyde resin, and an acidic crosslinking catalyst is not used.

14. The coating composition of claim 10, wherein said epoxy ester is the epoxy ester of claim 7, said solvent is a mixture of butanol, hexoxyethanol, and propylene glycol, said curing agent is hexamethoxymethylmelamine, and said acidic crosslinking catalyst is $\alpha$-(p-nonylphenol)-$\omega$-hydroxy-poly(oxyethylene) sulfate ammonium salt.

15. The coating composition of claim 10, wherein said epoxy ester is the epoxy ester of claim 8, said solvent is a mixture of propylene glycol, hexoxyethanol, and butanol, said curing agent is hexamethoxymethylmelamine, and said acidic crosslinking catalyst is $\alpha$-(p-nonylphenol)-$\omega$-hydroxy-poly(oxyethylene) sulfate ammonium salt.

16. A metal substrate coated with the coating composition of claim 9 and baked.

17. A metal substrate coated with the coating composition of claim 11 and baked.

18. A metal substrate coated with the coating composition of claim 12 and baked.

19. A metal substrate coated with the coating composition of claim 13 and baked.

20. A metal substrate coated with the coating composition of claim 14 and baked.

21. A metal substrate coated with coating composition of claim 15 and baked.

22. A metal food packaging container interior coated with the coating composition of claim 9 and baked, containing food or beverage.

23. A metal food packaging container interior coated with the coating composition of claim 11 and baked, containing food or beverage.

24. A metal food packaging container interior coated with the coating composition of claim 12 and baked, containing food or beverage.

25. A metal food packaging container interior coated with the coating composition of claim 13 and baked, containing food or beverage.

26. A metal food packaging container interior coated with the coating composition of claim 14 and baked, containing food or beverage.

27. A metal food packaging container interior coated with the coating composition of claim 15 and baked, containing food or beverage.

* * * * *

UNITED STATES PATENT AND TRADEMARK OFFICE
CERTIFICATE OF CORRECTION

PATENT NO. : 4,128,515
DATED : December 5, 1978
INVENTOR(S) : MICHAEL A. TOBIAS and CARLOS J. MARTINEZ It is certified that error appears in the above-identified patent and that said Letters Patent are hereby corrected as shown below:

Column 3   Line #42   "alkpoxyalkanol" should be

-- alkoxyalkanol --

Signed and Sealed this

Twelfth Day of June 1979

[SEAL]

Attest:

RUTH C. MASON
Attesting Officer

DONALD W. BANNER
Commissioner of Patents and Trademarks